(12) United States Patent
Awad et al.

(10) Patent No.: US 7,231,234 B2
(45) Date of Patent: Jun. 12, 2007

(54) METHOD AND APPARATUS FOR REDUCING ECHO IN A COMMUNICATION SYSTEM

(75) Inventors: Thomas Jefferson Awad, Kirkland (CA); Martin Laurence, Montreal (CA); Pascal Marcel Gervais, Montreal (CA)

(73) Assignee: Octasic Inc., Montreal, Quebec (CA)

( * ) Notice: Subject to any disclaimer, the term of this patent is extended or adjusted under 35 U.S.C. 154(b) by 396 days.

(21) Appl. No.: 10/719,377

(22) Filed: Nov. 21, 2003

(65) Prior Publication Data

US 2005/0123129 A1   Jun. 9, 2005

(51) Int. Cl.
*H04B 1/38* (2006.01)
(52) U.S. Cl. .................. 455/570; 455/569.1; 455/563; 381/66; 379/406.01; 379/406.08
(58) Field of Classification Search ................ 455/570, 455/569.1, 563; 381/66; 379/406.01, 406.08; 370/286, 290
See application file for complete search history.

(56) References Cited

U.S. PATENT DOCUMENTS

| | | | |
|---|---|---|---|
| 5,062,102 A | | 10/1991 | Taguchi |
| 6,097,971 A | * | 8/2000 | Hosoi ......................... 455/570 |
| 6,181,794 B1 | * | 1/2001 | Park et al. ............. 379/406.08 |
| 6,442,272 B1 | * | 8/2002 | Osovets ................ 379/406.01 |
| 6,704,415 B1 | * | 3/2004 | Katayama et al. ..... 379/406.01 |
| 6,804,203 B1 | | 10/2004 | Benyassine et al. |
| 2003/0138061 A1 | * | 7/2003 | Li ............................... 375/326 |

FOREIGN PATENT DOCUMENTS

| | | |
|---|---|---|
| CA | 2004379 | 6/1990 |
| CA | 2437477 | 2/2004 |
| EP | 1071225 | 1/2001 |

OTHER PUBLICATIONS

Ezzaidi et al., "A New Algorithm for Double Talk Detection and Separation in the COntext of Digital Mobile Radio Telephone," 1997 IEEE International Conference on Acoustics, Speech, and Signal Processing, ICASSP-97, vol. 3, Apr. 21-24, 1997.
Asharif et al., "Correlation LMS Algorithm and its Application to Double-talk Echo Cancelling," Electronics Letters, vol. 35, issue 3, pp. 194-195, Feb. 4, 1999.

* cited by examiner

*Primary Examiner*—Danh Le

(57) ABSTRACT

A method and apparatus for reducing echo in a communication system are provided. A first signal including a voice component associated to a speaker is received. The first signal is processed to derive a harmonic feature of the voice component. A second signal including an echo component correlated to the first signal is also received. The second signal is processed at least in part on the basis of the harmonic feature of the voice component to remove at least in part the echo component such as to derive an echo reduced signal. The echo reduced signal is then released. In specific implementations, the harmonic feature of the voice component is an estimate of the pitch associated to the voice component.

42 Claims, 10 Drawing Sheets

METHOD AND APPARATUS FOR REDUCING ECHO IN A COMMUNICATION SYSTEM

FIELD OF THE INVENTION

The present invention relates generally to communication systems and, more particularly, to a method and apparatus for use in reducing echo in a communication system.

BACKGROUND

Various adaptive filter structures have been developed for use in time updated adaptive systems to solve acoustical echo cancellation, line echo cancellation, channel equalization and other problems; examples of such structures include for example, transversal, multistage lattice, systolic array, and recursive implementations. Among these, transversal finite-impulse-response (FIR) filters are often used, due to stability considerations, and to their versatility and ease of implementation. Many algorithms have also been developed to adapt these filters, including the least-mean-square (LMS), recursive least-squares, sequential regression, and least-squares lattice algorithms.

A deficiency with the FIR filters commonly being used for echo-cancellation is that they do not easily remove echo in the presence of double-talk. Double-talk occurs when two entities in a communication exchange talk at the same time. In the absence of double talk, the entire signal can be removed and replaced by comfort noise and/or background noise. However in the presence of double talk, it is desirable to remove the echo component without substantially affecting the non-echo signal.

Consequently, there is a need in the industry for providing a method and apparatus for use in reducing echo in a communication system that alleviate at least in part the deficiencies of the prior art.

SUMMARY OF THE INVENTION

In accordance with a broad aspect, the invention provides a method suitable for use in reducing echo in a communication system. A first signal including a voice component associated to a speaker is received. A second signal including an echo component correlated to the first signal is also received. The method includes processing the first signal to derive a harmonic feature of the voice component. The method also includes processing the second signal at least in part on the basis of the harmonic feature of the voice component to remove at least in part the echo component such as to derive an echo reduced signal. The echo reduced signal is then released.

In a specific implementation, the harmonic feature of the voice component is an estimate of the pitch associated to the voice component. Alternatively, the harmonic feature of the voice component is a multiple of an estimate of the pitch associated to the voice component.

In another specific example of implementation, the method includes applying a filtering operation to the second signal at least in part on the basis of the estimate of the pitch associated to the voice component to derive the echo reduced signal.

In accordance with a non-limiting example of implementation, the first signal includes a first voice component and the second signal includes a second voice component, where the second voice component is associated to a second speaker. The method includes processing the first signal and the second signal to detect an occurrence of double talk. In response to detection of an occurrence of double talk, a set of filter coefficients is generated at least in part on the basis of the estimate of the pitch associated to the first voice component. A filtering operation is applied to the second signal on the basis of the set of filter coefficients to derive the echo reduced signal. The filtering operation may be a finite-impulse response (FIR) filtering operation, an infinite impulse response filtering operation (IIR) or any other suitable filtering operation. The finite-impulse response (FIR) filtering operation may be symmetric or asymmetric.

In a specific implementation, the filtering operation is adapted to filter a set of frequencies from the second signal to derive the echo reduced signal, the set of frequencies including frequencies which are integer multiples of the estimate of the pitch associated to the first voice component.

In accordance with another broad aspect, the invention provides an apparatus suitable for use in reducing echo in a communication system implementing the above-described method.

In accordance with yet another broad aspect, the invention provides a computer readable medium including a program element suitable for execution by a computing apparatus for use in reducing echo in a communication system in accordance with the above described method.

In accordance with another aspect, the invention provides a filter adaptation apparatus suitable for generating a set of filter coefficients. The filter adaptation apparatus includes an input for receiving a harmonic feature of a voice component in a signal. The filter adaptation apparatus also includes a processing unit operative for generating a set of filter coefficients at least in part on the basis of the harmonic feature of the voice component. The adaptation apparatus also includes an output for releasing the set of filter coefficients for use by a filter unit.

In a specific implementation, the harmonic feature of the voice component is an estimate of the pitch associated to the voice component.

In accordance with a specific example of implementation, the processing unit generates a first set of filter coefficients at least in part on the basis of the estimate of a pitch associated to the voice component, the first set of filter coefficients providing a symmetric impulse response filter. The processing unit processes the first set of filter coefficients to generate a second set of filter coefficients, the second set of filter coefficients providing an asymmetric impulse response filter.

In accordance with another broad aspect, the invention provides an apparatus suitable for use in reducing echo in a communication system. The apparatus comprises means for receiving a first signal including a voice component associated to a speaker. The apparatus also includes means for receiving a second signal including an echo component, the echo component being correlated to the first signal. The apparatus also comprises means for processing the first signal to derive a harmonic feature of the voice component and means for processing the second signal at least in part on the basis of the harmonic feature of the voice component to remove at least in part the echo component such as to derive an echo reduced signal. The apparatus also includes means for releasing the echo reduced signal.

In accordance with another broad aspect, the invention provides a filter adaptation apparatus suitable for generating a set of filter coefficients including an input, a processing unit and an output. The input is for receiving a harmonic feature of time varying signal. The processing unit generates a set of filter coefficients at least in part on the basis of the harmonic feature, the set of filter coefficients defining a finite-impulse response filter. The set of filter coefficients for use by a filter unit is released at the output.

In a specific implementation, the time varying signal is a voice signal and the harmonic feature is indicative of an estimate of the pitch associated with the voice signal.

In accordance with a specific implementation, the processing unit is operative for generating a first set of filter coefficients at least in part on the basis of the estimate of the harmonic feature, the first set of filter coefficients providing a symmetric impulse response filter. The processing unit also processes the first set of filter coefficients to generate a second set of filter coefficients, the second set of filter coefficients providing an asymmetric impulse response filter.

In a non-limiting implementation, the second set of filter coefficients is derived by performing a circular shift of the first set of filter coefficients. In a non-limiting example, where the first set of filter coefficients includes N coefficients, the second set of filter coefficients is derived by performing a circular shift of the first set of filter coefficients by N/2 or less.

In a specific implementation, the finite-impulse response filter is characterized by a length N and by a delay that is less than N/2 for certain frequency bands. In a non-limiting implementation, the finite-impulse response filter is characterized by a no delay for certain frequencies bands.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

A detailed description of the embodiments of the present invention is provided herein below, by way of example only, with reference to the accompanying drawings, in which.

Figure 1:
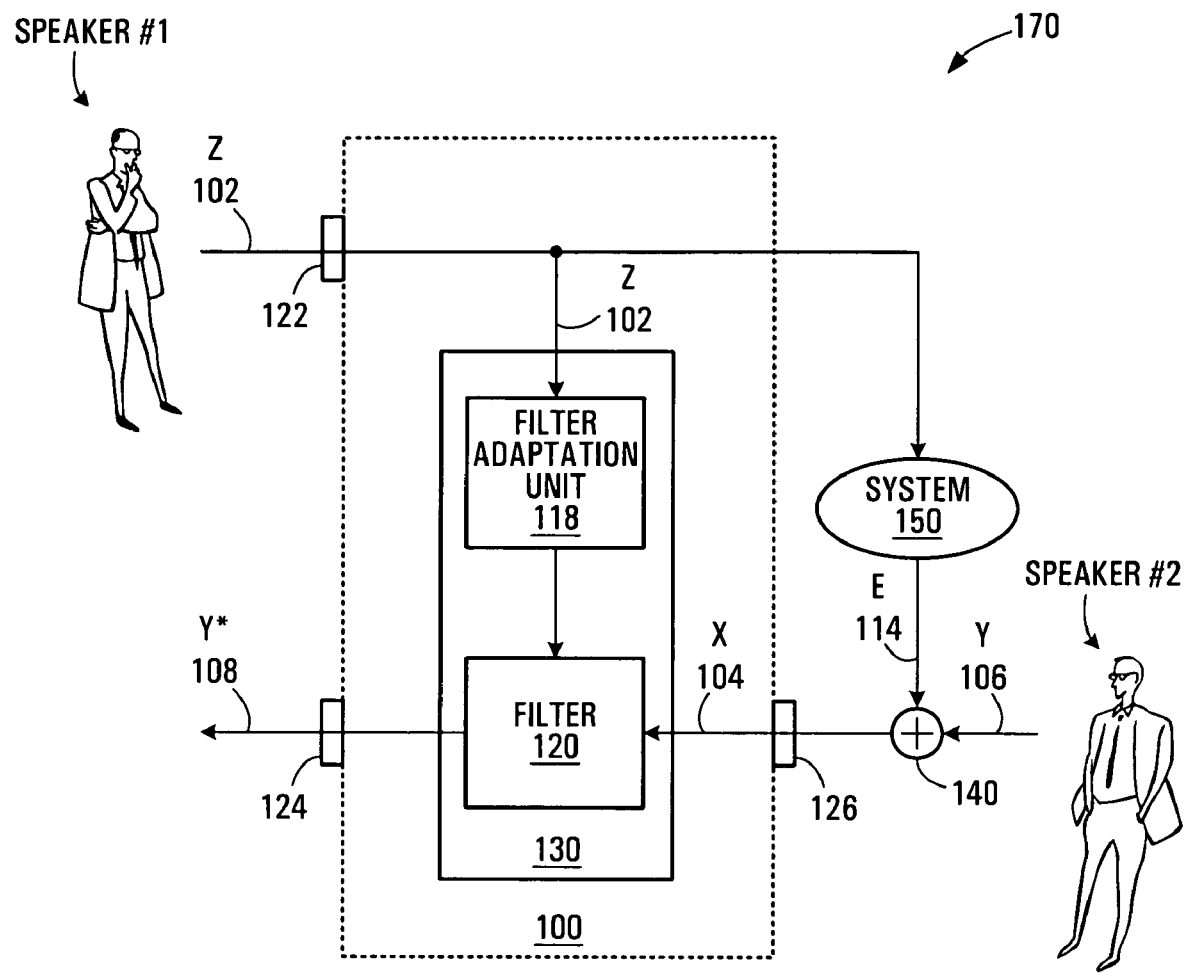
FIG. 1 is a high-level block diagram of an apparatus suitable for use in reducing echo in a communication system in accordance with an embodiment of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The present specification is directed to a specific example of the invention where a source of an echo or error signal is a voice signal. It will be appreciated by the person skilled in the art, in light of the present specification, that the principles described herein below are applicable to echo or noise caused by any time varying signal having a harmonic component where the time varying signal may be something other than voice.

FIG. 1 shows a communication system 170 in including an apparatus 100 for reducing echo in accordance with an embodiment of the present invention. A non-limiting use of the apparatus 100 is in the context of acoustical echo cancellation, for example, in a hands-free telephony system that includes a loudspeaker and a microphone. Apparatus 100 is used to remove unwanted components of a return signal Z 102 from a forward signal Y 106. Typically, the return signal Z 102 passes through a system 150 and emerges in the form of a noise signal E 114 which corrupts the forward signal Y 106, resulting in a corrupted forward signal X 104. In a digital system, this corruption process may be modelled as a sample-by-sample addition performed by a conceptual adder 140. Thus, each sample of the corrupted forward signal X 104 is the sum of a component due to the (clean) forward signal Y 106 and another component due to the noise signal E 114 where the noise signal E 114 is correlated to the return signal Z 102.

In this case, the forward signal Y 106 is a locally produced speech signal which is injected into the microphone (represented by conceptual adder 140), the return signal Z 102 is a remotely produced speech signal which is output by the loudspeaker, the system 150 is a room or car interior and the noise signal E 114 is a reverberated version of the return signal Z 102 which enters the same microphone used to pick up the forward signal Y 106. The corrupted forward signal X 104 is the sum of the signals input to the microphone, including the clean forward signal Y 106 as well as the reverberation represented by the noise signal E 114.

To cancel part of the corruptive effect of the noise signal E 114 on the forward signal Y 106, the apparatus 100 taps the return signal Z 102 (which feeds the system 150) in order to extract therefrom information associated to return signal Z 102. Such information includes information associated to the pitch of the speech signal in return signal Z 102. This information is then used to process forward signal X 104 to remove at least in part echo component E 114.

It is generally accepted that voice signals usually consist of harmonics (multiples) of a fundamental frequency called the pitch frequency. What this means is that, if a speaker's pitch frequency is at 210 Hz, the strongest components of his voice will be found at 210, 420, 630, etc Hz. A speaker's pitch frequency depends upon the length of that speaker's vocal tract. Consequently, there is a high likelihood that the pitch frequencies of 2 speakers will differ and the strongest components of the voice of the 2 speakers will occur in different frequency bands. By removing the frequency bands corresponding to multiples of the pitch frequency of the speech component of signal Z 102 from signal X 104 without significantly removing the other frequency components, the strongest components of signal E 114 can be removed from signal X 104. When the pitch of the speech component of signal Z 102 and the pitch of the speech component of signal Y 106 differ, the strongest frequency components of the speech component of signal Y 106 should occur at different frequencies than the strongest components of the speech component of signal Z 102. Consequently, the strongest components of signal E 114 can be removed from signal X 104 without removing the strongest frequency components of the speech component of signal Y 106 in order to derive signal Y* 108.

The manner in which the forward signal X 104 is processed to derive signal Y* 108 will now be described in greater detail. For the purpose of simplicity, with reference to FIG. 1, it is assumed that the signal Z 102 and Y 106 were generated by 2 speakers having different pitch frequencies. It is also assumed that the system 150 does not significantly distort the frequencies of the signal Z 102 and that therefore signal E 114 also has its strongest components at the same (multiples) of the pitch frequency of signal Z 102.

In the embodiment depicted in FIG. 1, the apparatus 100 for reducing echo includes a first input 122, a second input 126, a processing unit 130 and an output 124. The first input 122 is for receiving the first (return) signal Z 102 including a voice component, the voice component being associated to a speaker. The second input 126 is for receiving a second (forward) signal X 104 including an echo component E 114, the echo component E 114 being correlated to the first signal Z 102. The processing unit 130 processes the first (return) signal Z 102 to derive an estimate of a pitch associated to the voice component. The processing unit 130 processes the second signal second (forward) signal X 104 at least in part on the basis of the estimate of the pitch associated to the voice component to remove at least in part the echo component echo component E 114 such as to derive the echo reduced signal Y* 108. More specifically, processing unit 130 is adapted for applying a filtering operation to second signal X 104 at least in part on the basis of the estimate of the pitch associated to the voice component in signal Z 102 to derive the echo reduced signal Y* 108. The echo reduced signal Y* 108 is then released at output 124. It will be appreciated that apparatus 100 may be one module of an echo canceling system including other echo reduction modules for reducing echo in a communication system 170.

In a non-limiting implementation, the processing unit 130 comprises a filter adaptation module 118 and a filter 120. The filter adaptation module 118 receives signal Z 102 and generates a set of filter coefficients on the basis of the fundamental (pitch) frequency associated with the voice component in signal Z 102.

The filter 120 receives the set of filter coefficients from the filter adaptation module 118 and applies a filtering operation to the second signal X 104 to derive the echo reduced signal Y* 108. In a specific implementation, the filter 120 includes a plurality of taps at which delayed versions of the forward signal X 104 are multiplied by respective filter coefficients, whose values are denoted $h_j$, $0 \leq j \leq N-1$, where N is the number of taps in the filter. The N products are added together to produce the filter output at time T. Simply stated, therefore, the filtered signal Y* 108 at a given instant in time is a weighted sum of the samples of the forward signal X 104 at various past instances.

The filter coefficients $h_j$ are computed by filter adaptation unit 118 configured to receive the return signal Z 102. The manner in which the filter adaptation unit 118 processes these signals to compute the filter coefficients $h_j$ is described in greater detail below. Mathematically, the filtered signal Y* 108 at the output of the filter 120 can be described by the following relationship:

$$y_t^* = \sum_{i=0}^{N-1} h_i x_{t-i} \qquad \text{Equation 1}$$

where
t is the current sample time;
$y_t^*$ is the value of the filtered signal X 104 at time t;
$h_j$ is the value of the $j^{th}$ filter coefficient;
$x_k$ is a sample of the forward signal X 104 at time k; and
N is the length (i.e., the number of taps) of the filter 120.

For convenience, equation 1 may be represented in matrix form as follows:

$$y_t^* = \underline{h}^T \underline{x}_t \qquad \text{Equation 2}$$

where the underscore indicates a vector or matrix, where the superscript "$T$" denotes the transpose (not to be confused with the sample time "t" used as a subscript and where:

$$\underline{h} = \begin{bmatrix} h_0 \\ h_1 \\ \Lambda \\ h_{N-1} \end{bmatrix} \text{ and } \underline{x}_t = \begin{bmatrix} x_t \\ x_{t-1} \\ \Lambda \\ x_{t-(N-1)} \end{bmatrix} \qquad \text{Equation 3}$$

The output of the filter 120, namely the filtered signal Y* 108, is an estimate of the clean forward signal Y 106.

The manner in which the filter adaptation unit 118 computes the set of filter coefficients and the manner in which they may be used will now be described in greater detail.

In a specific implementation, the filter adaptation module 118 receives signal Z 102 and identifies the fundamental frequency associated with the voice component in signal Z 102 and releases an output signal indicative of a set of filter coefficients H. Any suitable method for identifying the fundamental frequency associated with the voice component in signal Z 102 may be used without detracting from the spirit of the invention. Such methods are well known in the art of speech processing an as such will not be described further here.

The filter adaptation module 118 then generates a set of filter coefficients at least in part on the basis of the estimate of the pitch associated to the first voice component. The set of filter coefficients is selected such as to filter or reduce frequency components which are multiples the pitch frequency without substantially filtering the other frequencies in the spectrum. The set filter coefficients may implement a symmetric filter, an asymmetric filter, an FIR filter or an IIR filter without detracting from the spirit of the invention. The selection of the set filter coefficients to remove certain specific frequencies while limiting the impact on intermediate frequencies may be effected according to any suitable method. A few specific examples of filters than can be used in embodiments of the present invention are described herein below. It will be appreciated by the person skilled in the art in light of the present description that other filter designs may be used to filter the multiples the pitch frequency without substantially filtering the other frequencies in the spectrum without detracting from the spirit of the invention.

Examples of Specific Implementations

In a specific implementation, the filter adaptation module 118 is operative for generating a set of filter coefficients implementing an FIR filter which removes or reduces the signals in frequency bands which are multiples the pitch frequency without substantially filtering the other frequencies in the spectrum.

A simple way to create a FIR filter is to create a symmetrical, linear-phase filter. One simple technique to derive an FIR filter is to use an inverse Fourier transform (IFT). The computation of an IFT is well-known in the art of digital signal processing and as such will not be described further here. Advantages of FIR filters is that they are easy to create, cause no phase distortion, and yield smooth frequency responses in the frequencies in between the frequency bands defined by the IFT. A disadvantage of FIR filters of the type described above is that they cause a group delay in the signal of N/2, where N is the length of the filter.

In a first step to derive an FIR filter, the desired frequency response of the filter is determined in the frequency domain at each of the frequencies defined by the IFT. For an N tap filter, N frequencies are defined by the IFT and therefor the desired frequency response at each of the N frequencies is determined. Each frequency is given a phase of 0. Following this, an inverse Fourier transform computation is performed, which will yield a symmetric filter around the 0 tap of the IFT's output. The taps of the filter are then centered so that the 0 tap, which is always the highest one, is centered at N/2.

Figure 2:
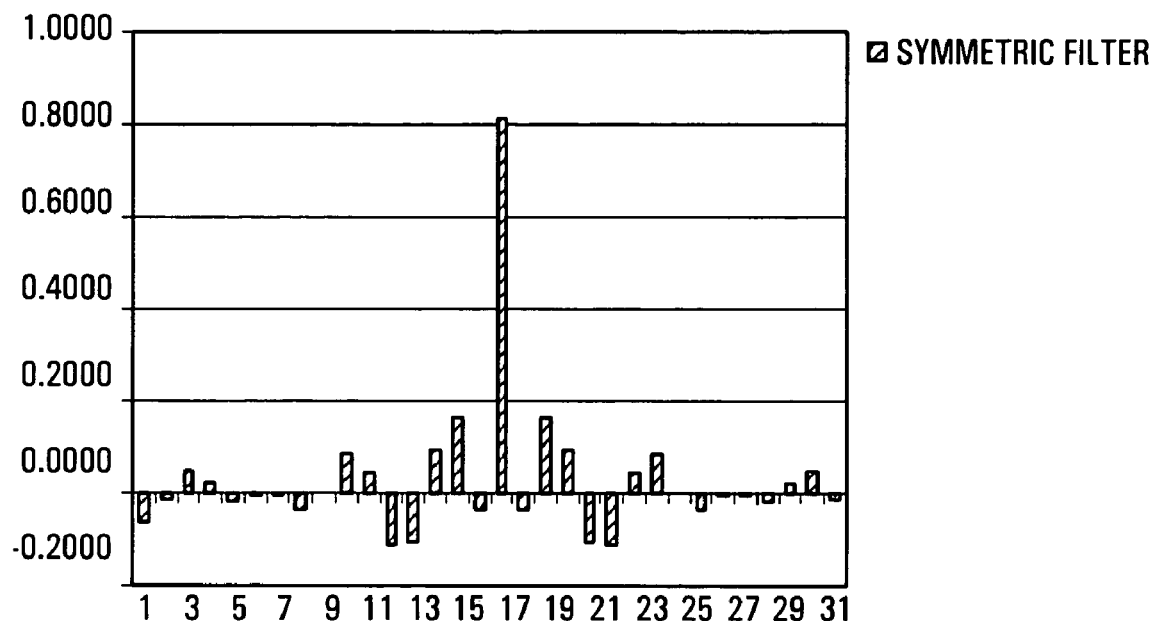
FIG. 2 is a diagram depicting the impulse response of a 32-point symmetric filter constructed using an IFT in accordance with a non-limiting implementation of the present invention.
Figure 3:
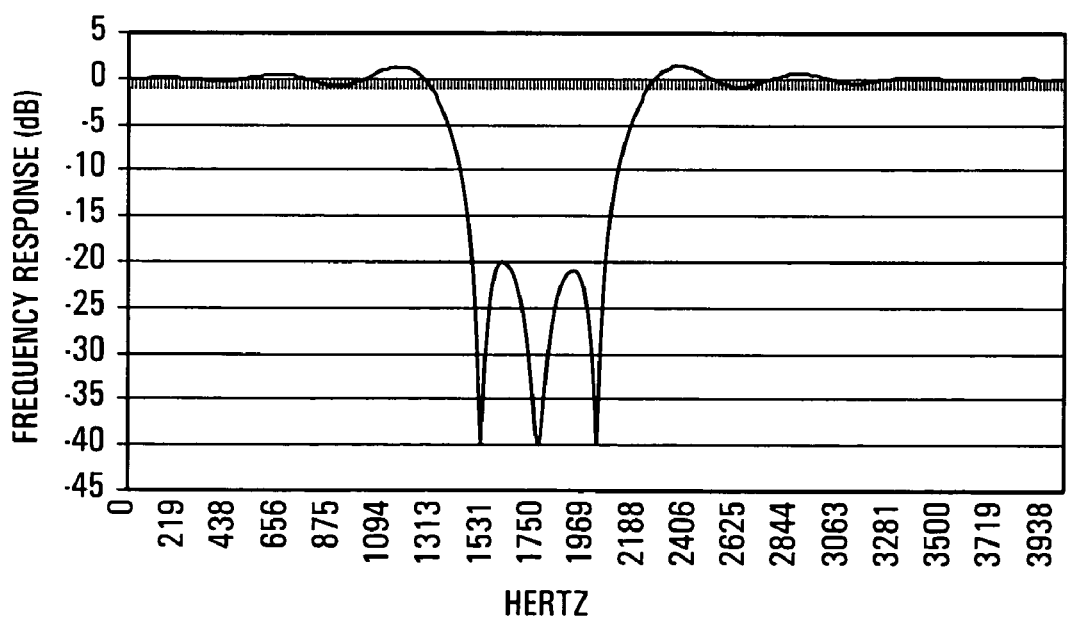
FIG. 3 is a diagram depicting the frequency response of the filter having the impulse response shown in FIG. 2.

FIG. 2 depicts the impulse response of a 32-point symmetric filter constructed using an IFT. The IFT used to create this filter has bands that are 250 Hz apart, and the filter should filter out the 1500 Hz, 1750 Hz and 2000 Hz bands. As can be observed, the main tap of this filter occurs at the midpoint of the impulse response (N/2=32/2=16). FIG. 3 depicts the frequency response of the filter shown in FIG. 2.

Figure 4:
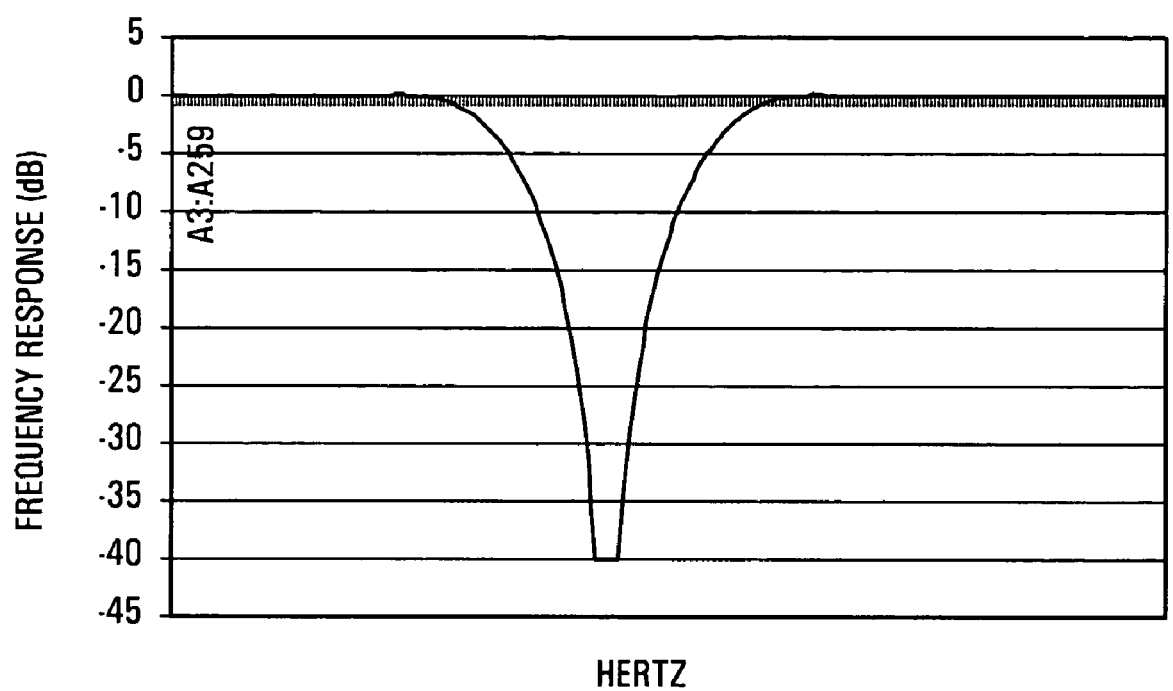
FIG. 4 is a diagram depicting the frequency response for the filter having the impulse response shown in FIG. 2 with a Hanning window applied.

This filter's frequency response can be smoothed out by applying a window to it. FIG. 4 of the drawings depicts the frequency response of the same filter shown in FIG. 3 with a Hanning window applied to it. Applying windows is well known in the field of signal processing and as such will not be described in further detail here.

The filter can be specified by a set of filter coefficients. It can be observed that the primary frequencies of a filter are multiples of (Sampling Rate/N) up to (Sampling Rate/2) where N is the length of the filter. In order to filter the multiples of the pitch frequency of the voice component of signal Z 102, the length N of the filter is selected in such a way as to have at least some of its primary frequencies aligned on the multiples of the pitch frequency of the voice component of signal Z 102. Since the sampling rate in the Telephone network is 8000 Hz, the examples below will use 8000 Hz as the sampling rate. Thus, for example, with a filter of length 32, the primary frequencies will be multiples of 8000/32=250, so they will be 0 Hz, 250 Hz, etc. all the way up 4000 Hz. Such a filter allows to remove selected frequencies multiple of 250 Hz. By selecting the proper set of filter coefficients the desired frequencies can be filtered efficiently.

Let us consider the case where all harmonics of a pitch frequency are to be removed from the second signal X 104. It will be appreciated that if a filter having frequency bands separated by the pitch frequency, then harmonics of the pitch frequency can be removed, however such a filter would also remove all other frequencies. In a first embodiment, to remove harmonics of the pitch frequency without removing all frequencies, we take a filter having frequency bands separated by half the pitch frequency. In order to remove the harmonics of a pitch frequency, every second band is removed. As an example, if our pitch is 250 Hz, then we will generate a filter of length:

$$N = \frac{8000 \text{ Hz}}{250 \text{ Hz}/2} = 64$$

Figure 5A:
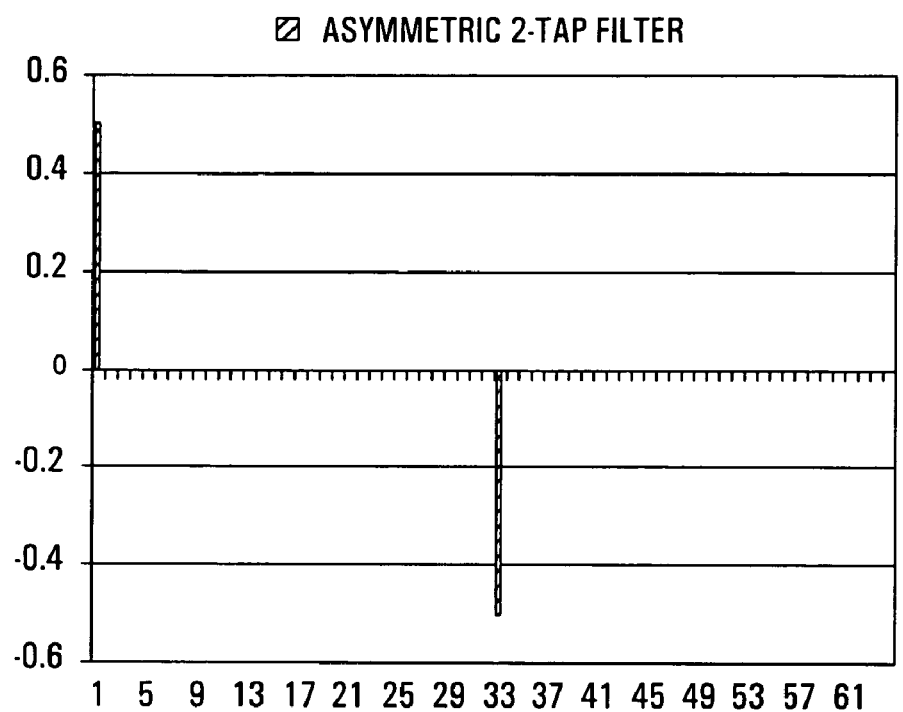
FIG. 5a is a diagram depicting the impulse response of a 64 tap filter adapted for removing frequency bands multiple (harmonics) of the pitch frequency (250 Hz) while letting the non-harmonic frequencies through relatively untouched in accordance with a specific example of implementation of the invention.

A filter of length N=64 has frequency bands which are 125 Hz apart. To remove the frequency bands multiple of the pitch frequency, every second band is removed namely bands at 0 Hz, 250 Hz, 500 Hz, . . . , 4000 Hz. An inverse Fourier Transform is then applied to obtain the impulse response of the filter. When we look at the resulting filter, for which the impulse response is depicted in FIG. 5*a*, it can be observed that it only has 2 taps: a tap of height 0.5 at delta 0, and a tap of height −0.5 at delta 32. Therefore, a computationally inexpensive filter can be created once we have found the pitch is a 2-tap filter, whose convolution with the signal X 104 only costs 2 operations.

Figure 5B:
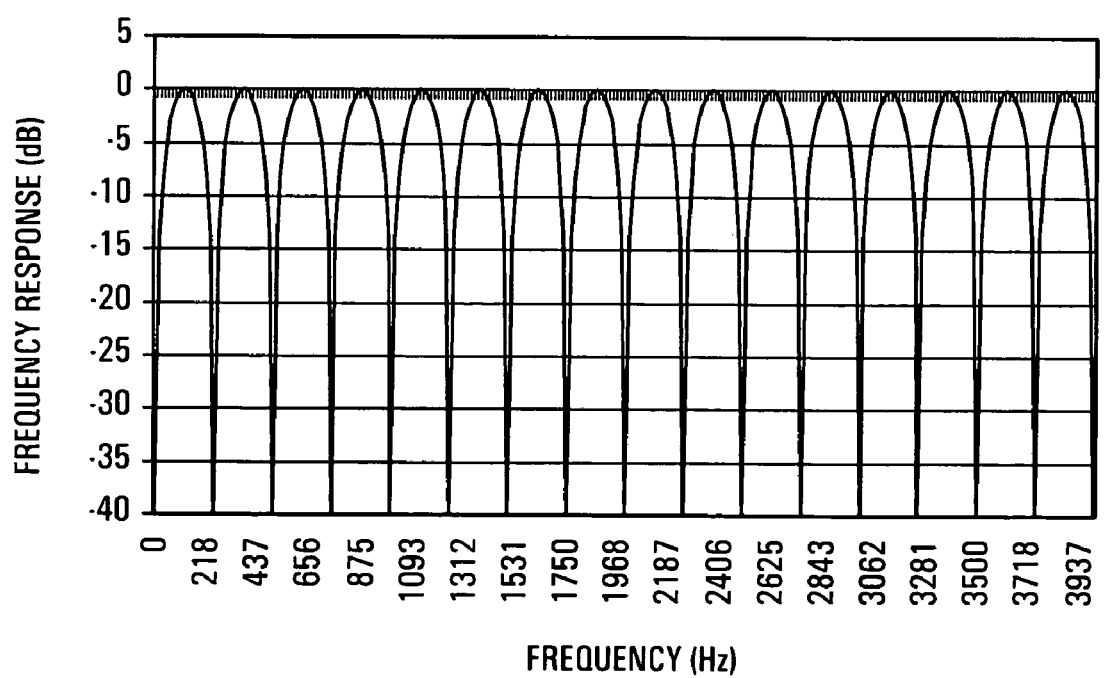
FIG. 5b is a diagram depicting the frequency response the filter shown in FIG. 5a in accordance with a specific example of implementation of the invention.

FIG. 5*b* shows us the resulting frequency response of the generated filter. As illustrated the filter lets the non-harmonic frequencies through relatively untouched, while aggressively eliminating the frequencies aligned on the undesired harmonics namely 0 Hz, 250 Hz, 500 Hz, . . . , 4000 Hz.

If we generalise the above-described specific embodiment, it can be shown that to remove harmonics of the pitch frequency without removing all frequencies, we take a filter having frequency bands separated by:

$$\frac{\text{pitch frequency}}{K} = \text{frequency band width}$$

where K is an positive integer equal or greater than 2. In order to remove the harmonics of a pitch frequency, every Kth band is removed. As an example, if our pitch is 250 Hz, then we will generate a filter of length:

$$N = \frac{8000 \text{ Hz}}{250 \text{ Hz}/K} = 32 \times K \text{ for } K = \{2, 3, 4, 5, \ldots\}$$

Figure 5C:
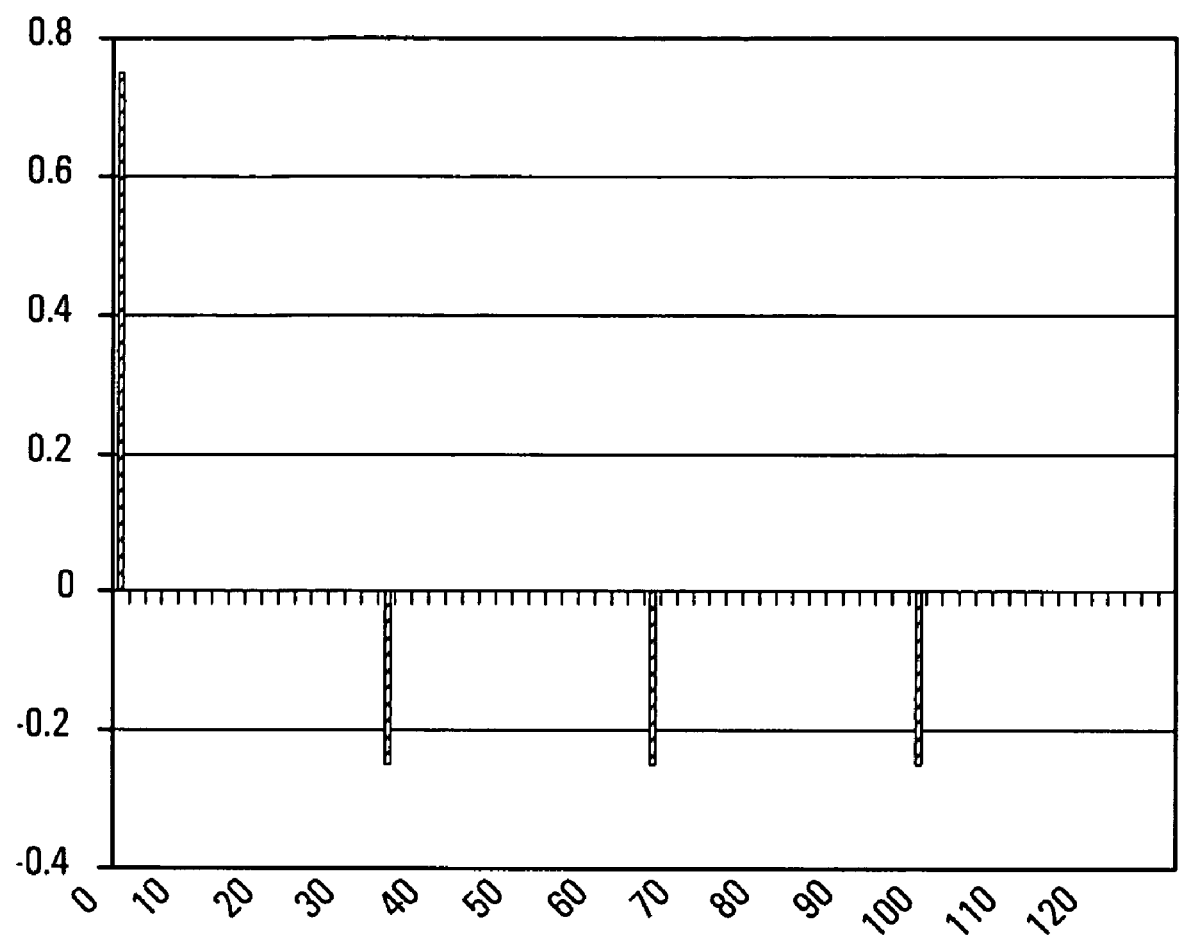
FIG. 5c is a diagram depicting the impulse response of a filter adapted for removing every Kth frequency bands in accordance with a specific example of implementation of the invention.
Figure 6A:
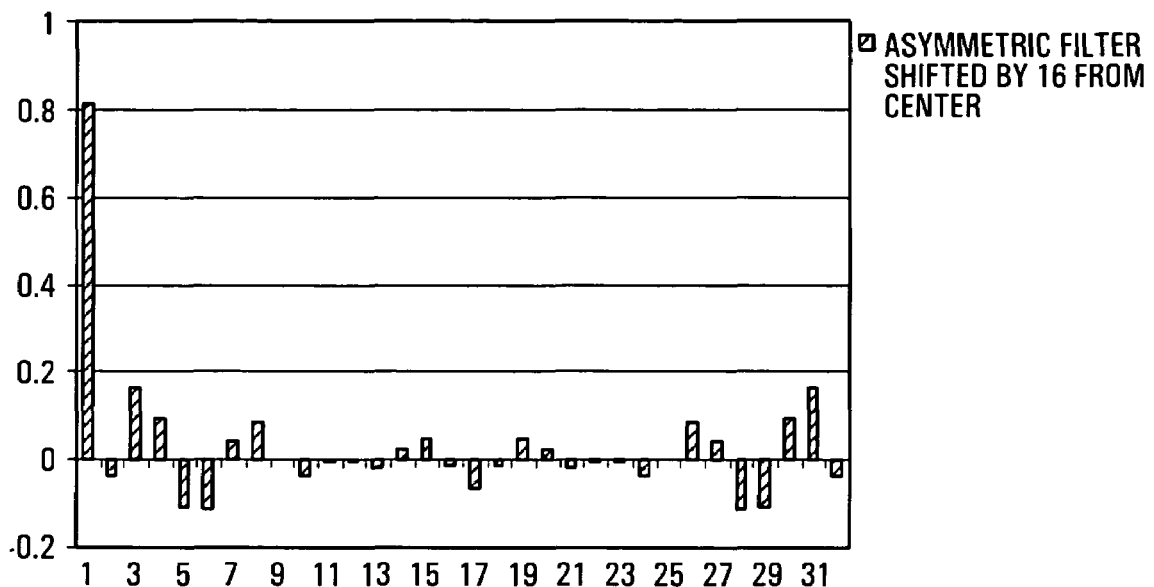
FIG. 6a depicts the impulse response of a 32-tap filter constructed using the FIR filter having the frequency response shown in FIG. 3 and performing a circular shift of the taps to the left from the center by M=N/2=16 in accordance with a specific example of implementation of the invention.
Figure 6B:
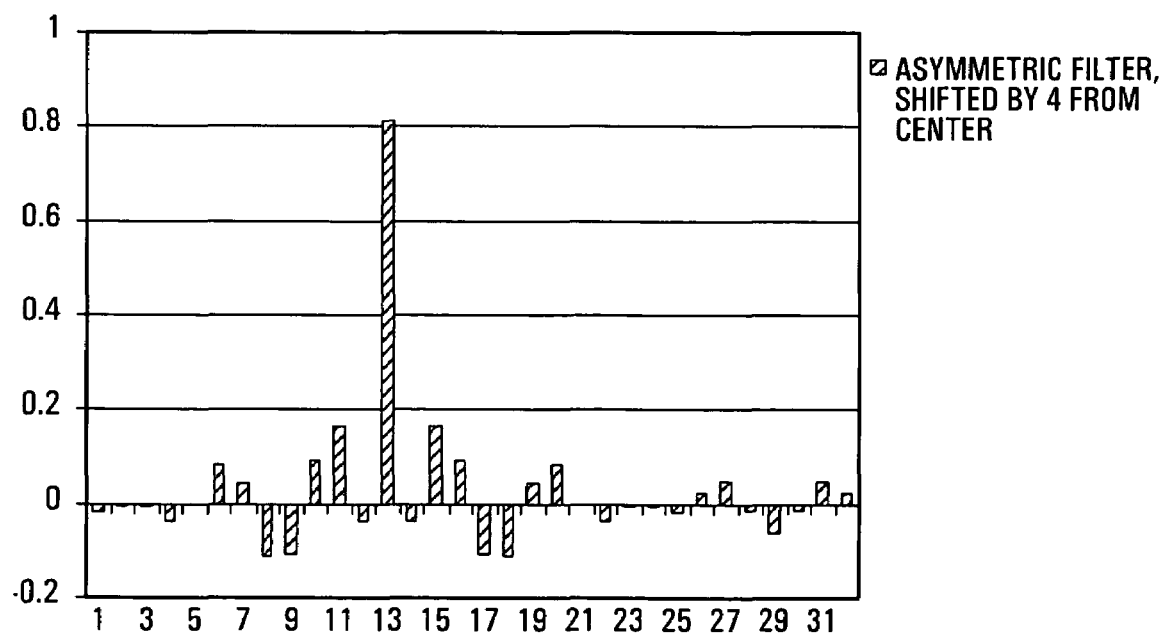
FIGS. 6b, 6c and 6d depict the impulse response of a 32-tap filter constructed using the FIR filter having the frequency response shown in FIG. 3 and performing circular shifts of the taps to the left from the center by M=4, 8 and 12 respectively in accordance specific examples of implementation of the invention.
Figure 6C:
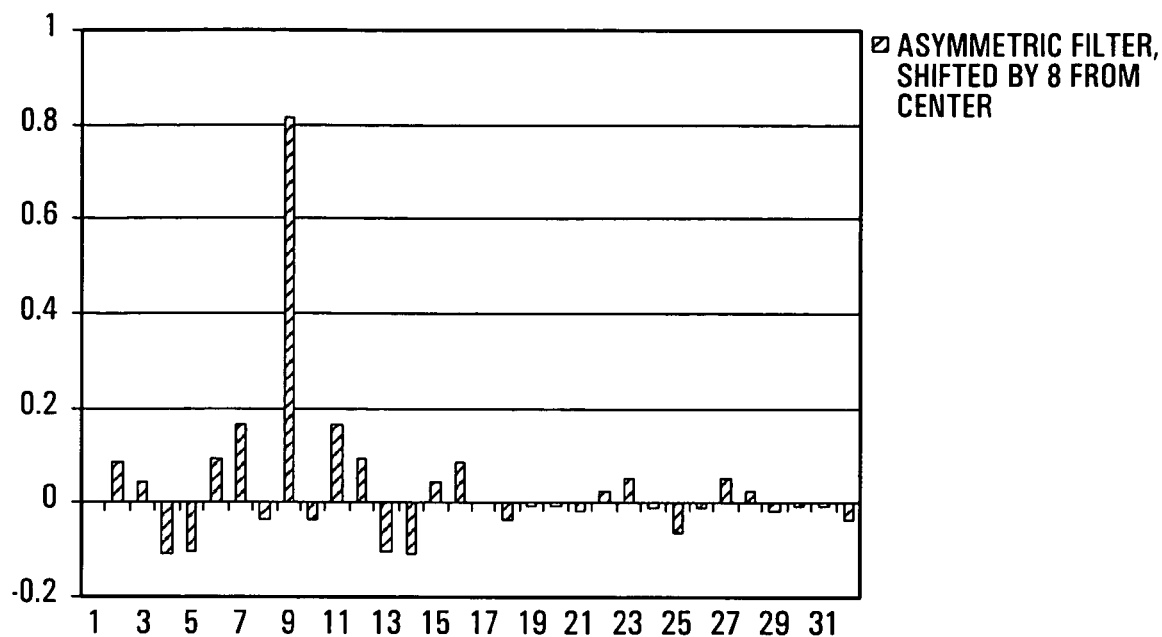
Figure 6D:
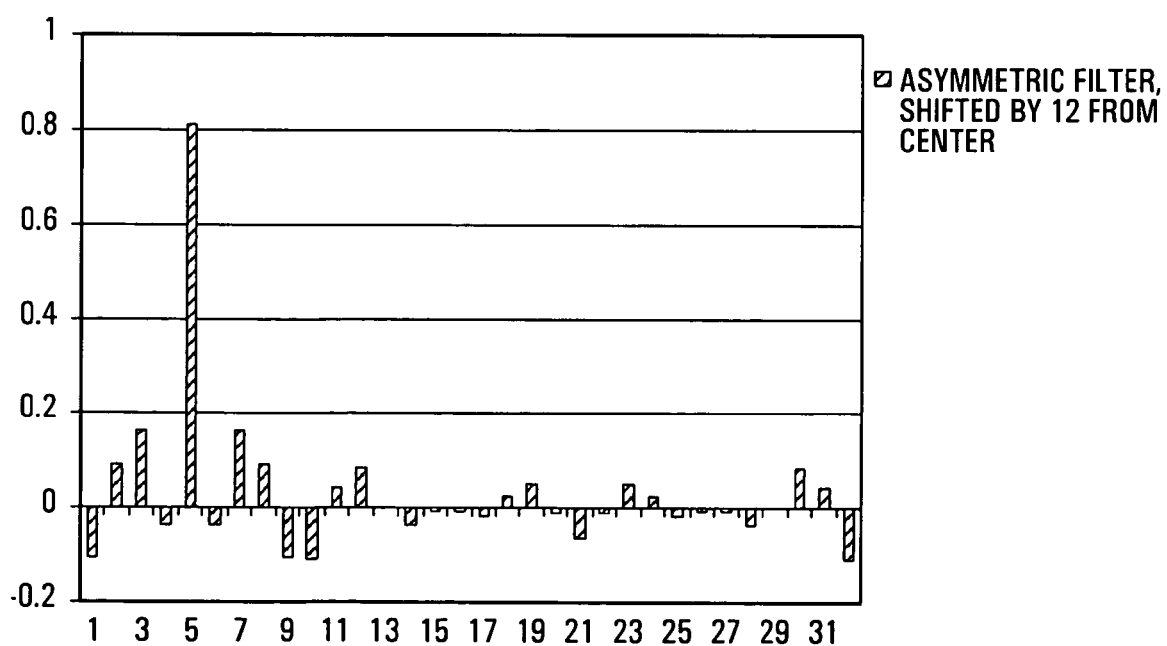

A filter of length N=128 (for K=4) has frequency bands which are 62.5 Hz apart. To remove the frequency bands multiple of the pitch frequency, every fourth band is removed namely bands at 0 Hz, 250 Hz, 500 Hz, . . . , 4000 Hz. When removing 1 band out of K in a filter of length N, the resulting filter will result in a filter with K active taps: tap 0, tap N/K, tap 2*N/K, etc until tap (K−1)*N/K. The amplitude of tap 0 will be 1−(1/K), and the amplitude of the other taps will be −1/K. The impulse response of a filter where K=4 is shown in FIG. 5c.

In another specific implementation, the filter adaptation module 118 is operative for generating a set of filter coefficients implementing a modified FIR filter. As indicated above, a disadvantage of traditional FIR filters of the type described above is that they cause a group delay in the signal of N/2, where N is the length of the filter.

In this second specific implementation, the delay of N/2 is reduced by shifting the impulse response of the resulting filter such that the main tap occurs closer to 0 instead of at N/2 where N is the number of taps in the filter.

In this example of implementation, the filter adaptation module 118 begins by generating a first set of filter coefficients implementing an FIR filter by first determining the desired frequency response of the filter in the frequency domain at each of the frequencies defined by the IFT and then performing an IFT. Following this, in order to reduced the delay, the taps of the filter in the impulse response are positioned such that the main tap occurs closer to 0 instead of at N/2 where N is the number of taps in the filter. In a non-limiting implementation, this is achieve by shifting the taps in the impulse response to the left by M taps where $0<M \leq N/2$. The shifting is performed such that the leftmost taps of the filter are shifted to the rightmost position in the impulse response. FIGS. 6a, 6b, 6c, 6d shows the impulse response of the resulting filter for various values of M for N=32.

In a non-limiting implementation, the main tap of the filter is positioned at 0 (M=N/2 for N even and M=N/2−0.5 for N odd. An advantage of this embodiment is that no delay is added in the filter in the bands that are passed through, which typically will yield superior results in delay-sensitive applications.

FIG. 6 depicts the impulse response of a 32-tap filter constructed using the above described process. This filter was first constructed by generating a first FIR filter having the frequency response shown in FIG. 3. This first FIR filter is characterized by a first set of filter coefficients and has a delay of N/2 for the main tap. The impulse response of the first FIR filter is shifted by N/2 so that the main tap occurs at 0. This second FIR filter is characterized by a second set of filter coefficients and has a delay of 0 for the main tap.

Figure 7:
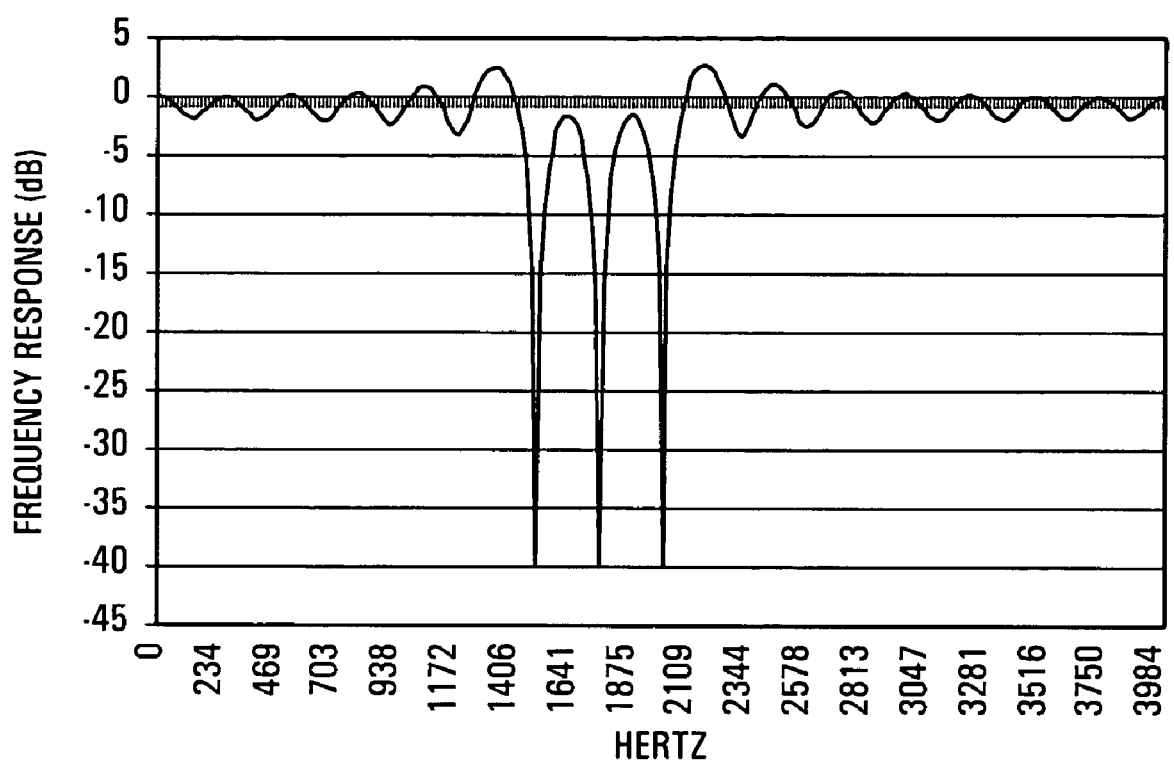
FIG. 7 is a diagram depicting the frequency response for the filter having the impulse response shown in FIG. 6.

The frequency response of the filter having the impulse response shown in FIG. 6 is depicted in FIG. 7. As depicted, the filter has a frequency response with some ripples in it, but it can be observed that the frequency response is near-zero at the exact frequencies to be filtered, namely the 1500 Hz, 1750 Hz and 2000 Hz. Substantially everywhere else, including between frequencies 1500 Hz, 1750 Hz and 2000 Hz, the frequency response is close to that of an all-pass filter.

In order to remove the harmonics of the pitch frequency, the length of our filter is selected so that its primary frequency is an integer divisor of the pitch frequency in the voice and the above described process is applied to derive the set of filtered coefficients.

Figure 8:
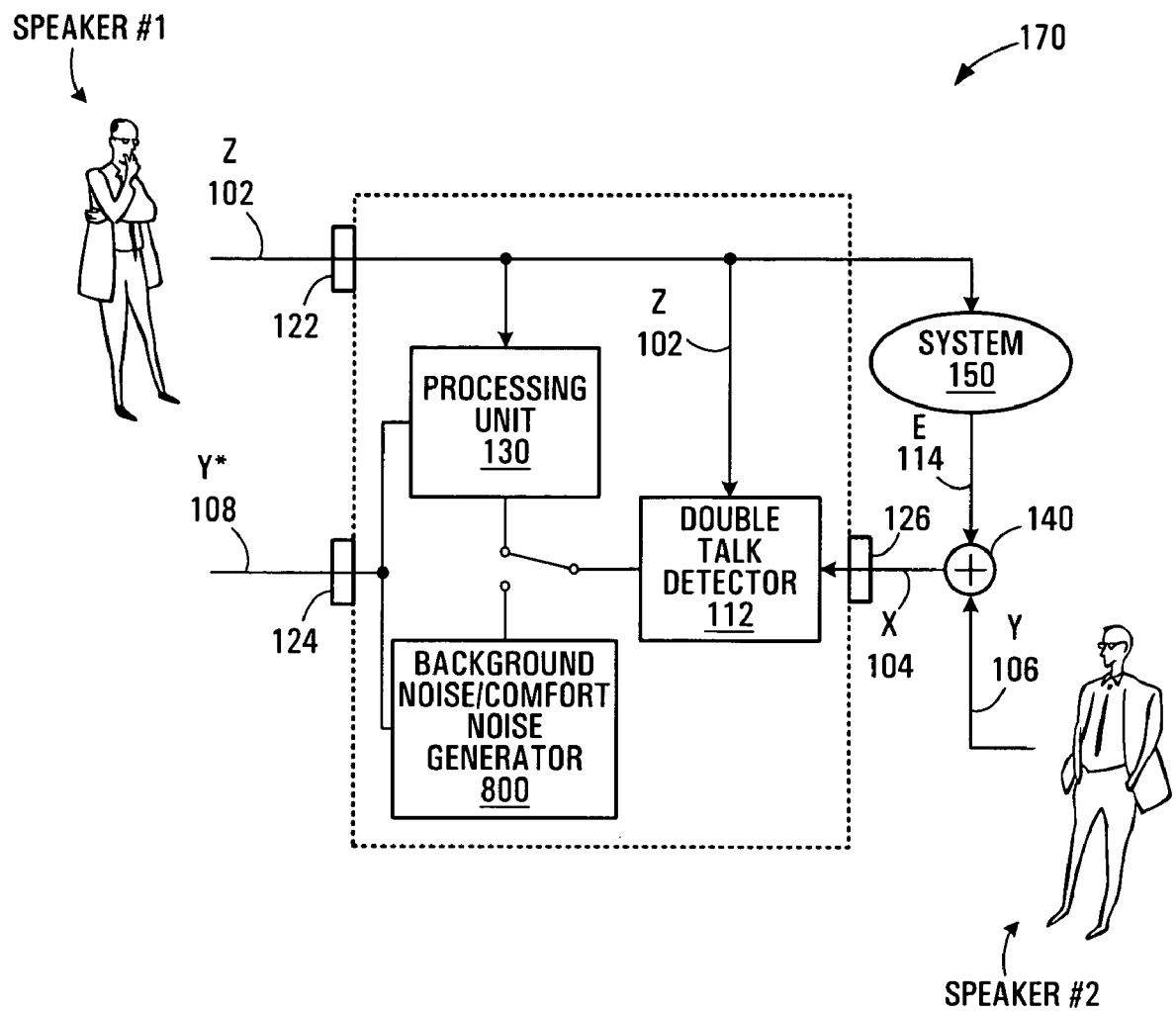
FIG. 8 is a high-level block diagram of an apparatus suitable for use in reducing echo in a communication system in accordance with an alternative example of implementation of the present invention.

It will be appreciated that the above described process of removing the frequency bands corresponding to multiples of the pitch frequency of signal Z 102 from signal X 104 is particularly useful where signal Y 106 includes a second speech signal. In other words, the above described process is particularly useful in the presence of double talk. In the absence of double talk, when signal Y 106 does not include a speech signal, signal X 104 will be essentially the same as signal E 114 except for some background noise. Such background noise can be generated synthetically by background noise generation module and/or comfort generator module. Consequently, in the absence of double talk, signal X 104 can be completely filtered out and replaced by the synthetically generated background noise. Therefore in a variant, of the type illustrated in FIG. 8, the apparatus 100 includes an optional double talk detection module 112 adapted for processing signal Z 102 and signal X 104 to detect an occurrence of double talk. The detection of an occurrence of double talk may be effected according to any suitable method. Such methods are well-known in the art of speech processing and as such will not be described further here. The double talk detection module 112 is adapted for causing the processing unit to applying a filtering operation to signal X 104 to filter the frequency bands corresponding to multiples of the pitch frequency of signal Z 102 from signal X 104. The apparatus also includes a background/comfort noise generator 800. In the absence of double talk, the double talk detection module 112 is adapted for causing the filtering operation to be bypassed and for background/comfort noise generator 800 to generate background/comfort noise for release at output 124. An advantage of this specific implementation is that it reduces the required computations in the absence of double talk. More specifically, the generation of background noise is less computationally costly that that of filtering. Since double-talk is a rare occurrence compared to the amount of silence and/or the presence of a single speaker, the use of a double talk detection module 112 results in a significant reduction in the computational requirements of apparatus 100.

Specific Physical Implementation

Figure 9:
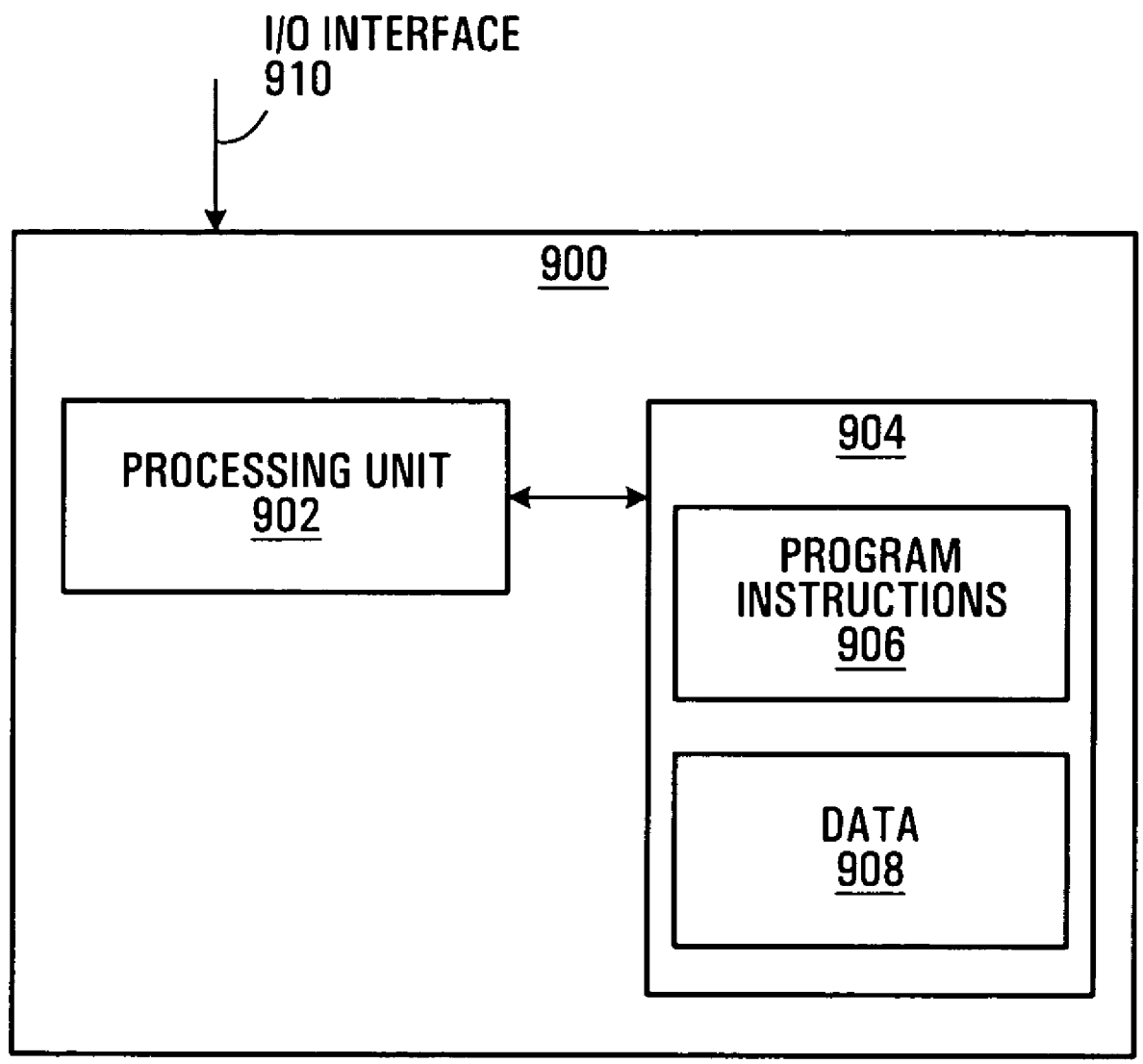
FIG. 9 is a block diagram of an apparatus suitable for use in reducing echo in a communication system in accordance with a specific example of implementation of the invention.

The above-described process for producing a set of filter coefficients can be implemented on a general purpose digital computer 900, of the type depicted in FIG. 9, including a processing unit 902 and a memory 904 connected by a communication bus. The memory includes data 908 and program instructions 906. The processing unit 902 is adapted to process the data 908 and the program instructions 906 in order to implement the functional blocks described in the specification and depicted in the drawings. The digital computer 900 may also comprise an I/O interface 910 for receiving or sending data elements to external devices. For example, the I/O interface 910 may be used for receiving the first signal Z 102 and the second signal X 104.

Alternatively, the above-described process for producing a set of filter coefficients can be implemented on a dedicated hardware platform where electrical/optical components implement the functional blocks described in the specification and depicted in the drawings. Specific implementations may be realized using ICs, ASICs, DSPs, FPGA or other suitable hardware platform. It will be readily appreciated that the hardware platform is not a limiting component of the invention.

Although the present specification has described specific example of the invention in the context of reducing echo in a communication system where a cause of the echo signal is a voice signal, the principles described in the present application are applicable to noise caused by any time varying signal including a harmonic component. In such variants, signal Z 102 is the time varying signal including a harmonic component and the filter adaptation unit 118 is adapted for identifying the fundamental frequency(ies) in the signal Z 102 and using the identified fundamental frequency(ies) to derive a set of filter coefficients in manner described previously in this specification.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A method suitable for use in reducing echo in a communication system, said method comprising:
   a) receiving a first signal including a voice component, the voice component being associated to a speaker;
   b) receiving a second signal including an echo component, the echo component being correlated to the first signal;
   c) processing said first signal to derive a harmonic feature of the voice component;
   d) deriving an echo reduced signal by processing said second signal to at least partly remove therefrom at least one frequency component related to the harmonic feature of the voice component; and
   e) releasing the echo reduced signal.

2. A method as defined in claim 1, wherein the harmonic feature of the voice component is an estimate of the pitch associated to the voice component.

3. A method as defined in claim 2, said method comprising applying a filtering operation to the second signal at least in part on the basis of the estimate of the pitch associated to the voice component to derive the echo reduced signal.

4. A method as defined in claim 2, wherein the voice component is a first voice component, said second signal including a second voice component the second voice component being associated to a second speaker.

5. A method as defined in claim 4, said method comprising:
   i. generating a set of filter coefficients at least in pan on the basis of the estimate of the pitch associated to the first voice component;
   ii. applying a filtering operation to the second signal on the basis of the set of filter coefficients generated in i to derive the echo reduced signal.

6. A method as defined in claim 5, said method comprising:
   a) processing the first signal and the second signal to detect an occurrence of double talk;
   b) in response to detection of an occurrence of double talk, processing the estimate of the pitch associated to the first voice component to derive a number of filter coefficients in said set of filter coefficients.

7. A method as defined in claim 5, wherein said filtering operation is a finite-impulse response (FIR) filtering operation.

8. A method as defined in claim 7, wherein said filtering operation is an asymmetric filtering operation.

9. A method as defined in claim 5, wherein said filtering operation is adapted to filter a set of frequencies from said second signal to derive the echo reduced signal, the set of frequencies including frequencies which are integer multiples of the estimate of the pitch associated to the first voice component.

10. A method as defined in claim 2, wherein the at least one frequency component comprises a plurality of frequency components related to the estimate of the pitch associated to the voice component.

11. A method as defined in claim 10, wherein the plurality of frequency components comprises a frequency component corresponding to the estimate of the pitch associated to the voice component; and at least one frequency component corresponding to at least one harmonic of the estimate of the pitch associated to the voice component.

12. A method as defined in claim 1, wherein the at least one frequency component comprises a plurality of frequency components related to the harmonic feature of the voice component.

13. An apparatus suitable for use in reducing echo in a communication system, said apparatus comprising:
   a) a first input for receiving a first signal including a voice component, the voice component being associated to a speaker;
   b) a second input for receiving a second signal including an echo component, the echo component being correlated to the first signal;
   c) a processing unit in communication with said first input and said second input, said processing unit being operative for:
      i. processing said first signal to derive a harmonic feature of the voice component; and
      ii. deriving an echo reduced signal by processing said second signal to at least partly remove therefrom at least one frequency component related to the harmonic feature of the voice component;
   d) an output for releasing the echo reduced signal.

14. An apparatus as defined in claim 13, wherein the harmonic feature of the voice component is an estimate of the pitch associated to the voice component.

15. An apparatus as defined in claim 14, wherein said processing unit is adapted for applying a filtering operation to the second signal at least in part on the basis of the estimate of the pitch associated to the voice component to derive the echo reduced signal.

16. An apparatus as defined in claim 14, wherein the voice component is a first voice component, said second signal including a second voice component, the second voice component being associated to a second speaker.

17. An apparatus as defined in claim 16, wherein said processing unit is adapted for:
   i. generating a set of filter coefficients at least in part on the basis of the estimate of the pitch associated to the first voice component;
   ii. applying a filtering operation to the second signal on the basis of the set of filter coefficients generated in i to derive the echo reduced signal.

18. An apparatus as defined in claim 17, wherein said processing unit is adapted for:
   a) processing the first signal and the second signal to detect an occurrence of double talk;
   b) in response to detection of an occurrence of double talk, processing the estimate of the pitch associated to the first voice component to derive a number of filter coefficients in said set of filter coefficients.

19. An apparatus as defined in claim 17, wherein said filtering operation is a finite-impulse response (FIR) filtering operation.

20. An apparatus as defined in claim 17, wherein said filtering operation is an asymmetric filtering operation.

21. An apparatus as defined in claim 17, wherein said filtering operation is adapted to filter a set of frequencies from said second signal to derive the echo reduced signal, the set of frequencies including frequencies which are integer multiples of the estimate of the pitch associated to the first voice component.

22. An apparatus as defined in claim 14, wherein said processing unit comprises:
  a) a pitch detection unit operative for processing the first signal to derive the estimate of a pitch associated to the voice component;
  b) a filter adaptation module operative for generating a set of filter coefficients at least in part on the basis of the estimate of a pitch associated to the voice component;
  c) a filter unit operative for processing the second signal on the basis of the set of filter coefficients to derive the echo reduced signal.

23. An apparatus as defined in claim 22, wherein said filter unit is a finite impulse response (FIR) filter.

24. An apparatus as defined in claim 23, wherein said filter unit is an asymmetric filter.

25. An apparatus as defined in claim 14, wherein the at least one frequency component comprises a plurality of frequency components related to the estimate of the pitch associated to the voice component.

26. An apparatus as defined in claim 25, wherein the plurality of frequency components comprises a frequency component corresponding to the estimate of the pitch associated to the voice component; and at least one frequency component corresponding to at least one harmonic of the estimate of the pitch associated to the voice component.

27. An apparatus as defined in claim 13, wherein the at least one frequency component comprises a plurality of frequency components related to the harmonic feature of the voice component.

28. A computer readable medium including a program element suitable for execution by a computing apparatus for use in reducing echo in a communication system, said computing apparatus comprising:
  a) a memory unit;
  b) a processor operatively connected to said memory unit, said program element when executing on said processor being operative for:
    i. receiving a first signal including a voice component, the voice component being associated to a speaker;
    ii. receiving a second signal including an echo component, the echo component being correlated to the first signal;
    iii. processing said first signal to derive a harmonic feature of the voice component;
    iv. deriving an echo reduced signal by processing said second signal to at least partly remove therefrom at least one frequency component related to the harmonic feature of the voice component; and
    v. releasing the echo reduced signal.

29. A computer readable medium as defined in claim 28, wherein the harmonic feature of the voice component is an estimate of the pitch associated to the voice component.

30. A computer readable medium as defined in claim 29, said program element when executing on said processor being operative for applying a filtering operation to the second signal at least in part on the basis of the estimate of the pitch associated to the voice component to derive the echo reduced signal.

31. A computer readable medium as defined in claim 29, wherein the voice component is a first voice component, said second signal including a second voice component, the second voice component being associated to a second speaker.

32. A computer readable medium as defined in claim 31, said program element when executing on said processor being operative for:
  i. generating a set of filter coefficients at least in part on the basis of the estimate of the pitch associated to the first voice component;
  ii. applying a filtering operation to the second signal on the basis of the set of filter coefficients generated in i. to derive the echo reduced signal.

33. A computer readable medium as defined in claim 32, said program element when executing on said processor being responsive to detection of an occurrence of double talk for processing the estimate of the pitch associated to the first voice component to derive a number of filter coefficients in said set of filter coefficients.

34. A computer readable medium as defined in claim 32, wherein said filtering operation is a finite-impulse response (FIR) filtering operation.

35. A computer readable medium as defined in claim 34, wherein said filtering operation is an asymmetric filtering operation.

36. A computer readable medium as defined in claim 32, wherein said filtering operation is adapted to filter a set of frequencies from said second signal to derive the echo reduced signal, the set of frequencies including frequencies which are integer multiples of the estimate of the pitch associated to the first voice component.

37. A computer readable medium as defined in claim 29, wherein said program element when executing on said processor being operative for implementing:
  a) a pitch detection unit operative for processing the first signal to derive the estimate of a pitch associated to the voice component;
  b) a filter adaptation module operative for generating a set of filter coefficients at least in part on the basis of the estimate of a pitch associated to the voice component;
  c) a filter unit operative for processing the second signal on the basis of the set of filter coefficients to derive the echo reduced signal.

38. A computer readable medium as defined in claim 29, wherein the at least one frequency component comprises a plurality of frequency components related to the estimate of the pitch associated to the voice component.

39. A computer readable medium as defined in claim 38, wherein the plurality of frequency components comprises a frequency component corresponding to the estimate of the pitch associated to the voice component; and at least one frequency component corresponding to at least one harmonic of the estimate of the pitch associated to the voice component.

40. A computer readable medium as defined in claim 28, wherein the at least one frequency component comprises a plurality of frequency components related to the harmonic feature of the voice component.

41. An apparatus suitable for use in reducing echo in a communication system, said apparatus comprising:
  a) means for receiving a first signal including a voice component, the voice component being associated to a speaker;
  b) means for receiving a second signal including an echo component, the echo component being correlated to the first signal;
  c) means for processing said first signal to derive a harmonic feature of the voice component;
  d) means for deriving an echo reduced signal by processing said second signal to at least partly remove therefrom at least one frequency component related to the harmonic feature of the voice component;
  e) means for releasing the echo reduced signal.

42. An apparatus as defined in claim 41, wherein the at least one frequency component comprises a plurality of frequency components related to the harmonic feature of the voice component.

* * * * *

UNITED STATES PATENT AND TRADEMARK OFFICE
CERTIFICATE OF CORRECTION

| | | |
|---|---|---|
| PATENT NO. | : 7,231,234 B2 | Page 1 of 1 |
| APPLICATION NO. | : 10/719377 | |
| DATED | : June 12, 2007 | |
| INVENTOR(S) | : Thomas Jefferson Awad et al. | |

It is certified that error appears in the above-identified patent and that said Letters Patent is hereby corrected as shown below:

Claim 4, line 3 should read: --...voice component, the second...--
Claim 5, line 3 should read: --...at least in part pan on the ...--
Claim 26, line 5 should read: --...to at least harmonic barmonic of the...--

Signed and Sealed this

Sixth Day of November, 2007

JON W. DUDAS
*Director of the United States Patent and Trademark Office*